US009339935B2

(12) United States Patent (10) Patent No.: US 9,339,935 B2
Ravindran et al. (45) Date of Patent: May 17, 2016

(54) SCALABLE COMMON INTERFACE PLATE SYSTEM (SCIPS)

(71) Applicant: MACDONALD DETTWILER & ASSOCIATES INC., Brampton (CA)

(72) Inventors: Rangaswamy Ravindran, Caledon (CA); Sean Andrew Dowling, Welsford (CA); Ming Kit Chan, Concord (CA)

(73) Assignee: MACDONALD, DETTWILER AND ASSOCIATES INC., Brampton, ON (CA)

( * ) Notice: Subject to any disclaimer, the term of this patent is extended or adjusted under 35 U.S.C. 154(b) by 168 days.

(21) Appl. No.: 14/221,946

(22) Filed: Mar. 21, 2014

(65) Prior Publication Data

US 2014/0250684 A1 Sep. 11, 2014

Related U.S. Application Data

(62) Division of application No. 13/028,051, filed on Feb. 15, 2011, now Pat. No. 8,702,341.

(60) Provisional application No. 61/305,266, filed on Feb. 17, 2010.

(51) Int. Cl.
*B25J 15/04* (2006.01)
*F16B 21/02* (2006.01)
*B23B 31/107* (2006.01)

(52) U.S. Cl.
CPC .............. *B25J 15/0425* (2013.01); *B25J 15/04* (2013.01); *B23B 31/107* (2013.01); *B23B 31/1074* (2013.01); *B23B 31/1078* (2013.01); *B25J 15/0408* (2013.01); *F16B 21/02* (2013.01); *Y10T 29/49117* (2015.01); *Y10T 29/49771* (2015.01); *Y10T 29/49826* (2015.01); *Y10T 29/49876* (2015.01); *Y10T 29/49897* (2015.01); *Y10T 403/7075* (2015.01)

(58) Field of Classification Search
CPC .... B25J 15/0425; B25J 15/04; B25J 15/0408; Y10T 29/49897; Y10T 29/49876; Y10T 403/7075; Y10T 29/49826; Y10T 29/49117; Y10T 29/49771; B23B 31/1078; B23B 31/107; B23B 31/1074; F16B 21/02
See application file for complete search history.

(56) References Cited

U.S. PATENT DOCUMENTS

| 5,018,901 A | 5/1991 | Ferree et al. |
| 5,660,493 A | 8/1997 | Stephens |
| 5,782,571 A | 7/1998 | Hufford et al. |

(Continued)

FOREIGN PATENT DOCUMENTS

| EP | 0441397 A1 | 8/1991 |
| JP | 2030483 A | 1/1990 |

(Continued)

OTHER PUBLICATIONS

International Search Report (PCT/CA2011/050089) dated Jun. 30, 2011, completed Jun. 28, 2011.

*Primary Examiner* — John C Hong
(74) *Attorney, Agent, or Firm* — Lynn C. Schumacher; Stephen W. Leonard; Hill & Schumacher (57) ABSTRACT

The present invention provides a low profile, compact, scalable concept end-effector for use in robotic handling applications. The end-effector acts as the interface between multi-degree-of-freedom (DOF) manipulator and its base (if applicable), as well as the tools it handles and is compatible with both large manipulator systems such as the Shuttle Remote Manipulator System (SRMS) and Space Station Remote Manipulator System (SSRMS) and smaller dexterous manipulators such as the Orbital Express Dexterous Manipulator System. An active/controlled component is attached to the roll joint(s) at one or both end(s) of the manipulator, with an entirely passive component attached to the structure/tools that the manipulator interfaces with. Interface engagement and mate operations are performed by way of the manipulator roll joint. Once mated, shear pins are extended to lock the mated assembly in place and achieve a high stiffness, zero free play mated interface.

7 Claims, 7 Drawing Sheets

(56) References Cited

U.S. PATENT DOCUMENTS

| | | |
|---|---|---|
| 7,794,171 B2 | 9/2010 | Park et al. |
| 2009/0044655 A1 | 2/2009 | DeLouis et al. |

FOREIGN PATENT DOCUMENTS

| | | |
|---|---|---|
| JP | 2121778 A | 5/1990 |
| JP | 6034282 A | 2/1994 |
| WO | 2011019742 A1 | 2/2011 |

SCALABLE COMMON INTERFACE PLATE SYSTEM (SCIPS)

CROSS REFERENCE TO RELATED PATENT APPLICATION

This patent application is a divisional application of U.S. patent application Ser. No. 13/028,051, filed in English on Feb. 15, 2011, which relates to and claims the priority benefit from, U.S. Provisional Patent Application Ser. No. 61/305, 266 filed on Feb. 17, 2010 entitled "Scalable Common Interface Plate System (SCIPS)" filed in English, all of which are incorporated herein by reference in their entirety.

FIELD OF THE INVENTION

The present invention relates to a scalable common interface plate system for use with robotic manipulators.

BACKGROUND OF THE INVENTION

Many space robotic manipulator designs to-date have been especially accommodating with respect to allowable interface misalignments. While this requirement has the obvious advantage of a generous capture window, it has also imposed considerable mass penalty and a high level of complexity on the manipulator's end-effectors. Current generation robotics performing operations local to the manipulator (i.e. on a common structure) can be expected to have significantly better alignment prior to capture and would as a consequence deem most of the end-effector's misalignment tolerance as superfluous.

With this situation in mind, it would be very advantageous to provide a new interface configured to provide a lightweight, low cost alternative for applications not requiring the full capabilities of traditional snare rigidize end-effectors which tend to have high mass and superfluous capture misalignment capabilities.

SUMMARY OF THE INVENTION

The present invention provides a low profile, compact, scalable concept end-effector for use in robotic handling applications. The end-effector acts as the interface between a multi-degree-of-freedom (DOF) manipulator and its base (if applicable), as well as the tools it handles and is compatible with both large manipulator systems such as the Shuttle Remote Manipulator System (SRMS) and Space Station Remote Manipulator System (SSRMS) and smaller dexterous manipulators such as the Orbital Express Dexterous Manipulator System (OEDMS class) manipulators. An active/controlled component is attached to the roll joint(s) at one or both end(s) of the manipulator, with an entirely passive component attached to the structure/tools that the manipulator interfaces with. Interface engagement and mate operations are performed by way of the manipulator roll joint. Once mated, shear pins are extended to lock the mated assembly in place and achieve a high stiffness, zero free play mated interface.

Thus, there is provided an embodiment of a scalable common interface plate system for use with a robotic manipulator, comprising:

a) an active base interface plate including a housing structure, said housing structure including a base plate and a top plate, said top plate having attachment points for affixing to said robotic manipulator, said active base interface plate including a locking mechanism mounted in said housing structure on an internal side of said base plate, said locking mechanism including at least one wedge protruding through an aperture in said base plate, said locking mechanism including at least one locking pin and an actuator for extending and retracting said pins; and b) a passive base interface plate including a first and second side, said first side having attachment points for attaching said passive base interface plate to an object, said passive base interface plate including at least one slot through which said at least one wedge can be inserted and withdrawn, said passive base interface plate including at least one pin hole on said second side for receiving said at least one locking pin, said first side including at least one complementary surface associated with said at least one slot, said complementary surface being contoured for receiving said at least one wedge.

In an embodiment, to perform a mating operation, said robotic manipulator having said active base interface plate affixed thereto maneuvers said active base interface plate such that said at least one wedge protrudes through said at least one slot and subsequently rotates said housing structure such that said at least one wedge contacts said complementary surface, at which point said actuator is commanded to extend said at least one locking pin into said at least one pin hole, such that said active base interface plate is mated to said passive base interface plate, and wherein to perform a demating operation of said active base interface plate from said passive base interface plate, said actuator is commanded to retract said at least one locking pin, and said robotic manipulator is commanded to maneuver said active base interface plate away from said passive base interface plate.

The present invention also provides a method of mating an object to a robotic manipulator, said method comprising the steps of:

providing an active base interface plate affixed to said robotic manipulator, said active base interface plate including at least one wedge protruding from said active base interface plate, at least one locking pin, and an actuator for extending and retracting said at least one locking pin, providing a passive base interface plate affixed to said object, said passive base interface plate including at least one slot and at least one pin hole, commanding said robotic manipulator to maneuver said active base interface plate affixed to said robotic manipulator towards said passive base interface plate such that said at least one wedge protrudes through said at least one slot, commanding said robotic manipulator to rotate said active base interface plate such that said at least one wedge contacts a bottom surface of said passive base interface plate, and commanding said robotic manipulator to extend said at least one locking pin into said at least one pin hole.

The interface disclosed herein is very advantageous in that it results in a high stiffness, low power, and compact end-effector design. It uses a barrel-cam component design which removes the need for mechanism brakes, while utilizing a sequencing of cam surfaces which enables multi-mechanism actuation from a single motor.

A further understanding of the functional and advantageous aspects of the invention can be realized by reference to the following detailed description and drawings.

BRIEF DESCRIPTION OF THE DRAWINGS

Preferred embodiments of the invention will now be described, by way of example only, with reference to drawings. Drawings are not necessarily to scale. For clarity and conciseness, certain features of the invention may be exaggerated and shown in schematic form.

DETAILED DESCRIPTION OF THE INVENTION

Generally speaking, the systems described herein are directed to a scalable common interface plate system (SCIPS) for robotic systems. As required, embodiments of the present invention are disclosed herein. However, the disclosed embodiments are merely exemplary, and it should be understood that the invention may be embodied in many various and alternative forms.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to a scalable common interface plate system (SCI PS) for robotic systems.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "about" and "approximately", when used in conjunction with ranges of dimensions of components, or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

System Overview

Figure 1:
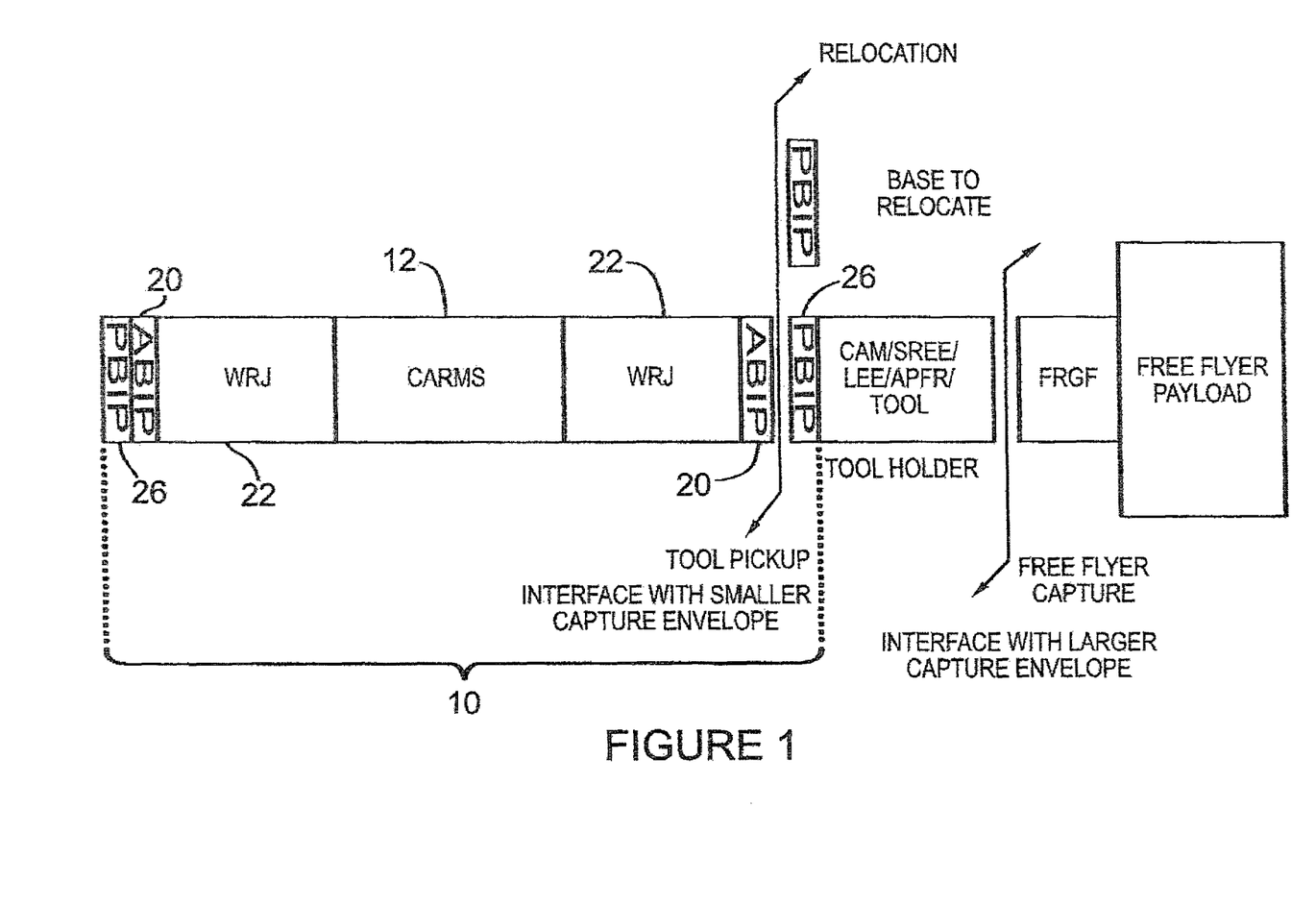
FIG. 1 shows a block diagram of a scalable common interface plate system in accordance with the present invention.

The interface described in this application is referred to as a scalable common interface plate system (SCIPS) which comprises an active base interface plate (ABIP) on the manipulator side and a passive base interface plate (PBIP) on the structure/payload side. FIG. 1 shows the general conceptual layout of the scalable common interface plate system shown generally at 10 which is intended to act as the interface between a multi-DOF (degree of freedom) manipulator 12 and its base, as well as the tools it handles and is compatible with both large shuttle remote manipulator system (SRMS) and space station remote manipulator system (SSRMS) and small orbital express dexterous manipulator system (OEDMS class or smaller) manipulators. In this way, the accuracy of the manipulator 12 can be exploited to the benefit of much lighter, simpler hardware while still addressing free-flyer capture (or other specialized) situations with a selection of available tools.

An active base interface plate 20 is attached to each of the two roll joints 22 of the manipulator 12 while passive base interface plates 26 are attached to the structure at each of the desired manipulator base locations as well as to the tools and payloads that are to be picked up by the manipulator 12. The active base interface plate 20 includes two sets of interface wedges that engage with a corresponding set of complementary surfaces located on either a full-size passive base interface plate 26 (for large payloads, base operations, heavy tools, etc. . . . ) or a reduced size passive base interface plate 26 (for small payloads, tools, etc. . . . ).

Interface engagement and mate operations are performed by way of the manipulator roll joint 22. Once mated, shear pins are driven from the active base interface plate 20 into the passive base interface plates 26 to lock the mated assembly in place and achieve a high stiffness, zero free play mated interface. General operation of the scalable common interface plate system is a staged operation similar to grapple operations employed with the power data grapple fixture (PDGF). Initial positioning and interface alignment is performed with standard manipulator operations assisted by a vision system integral to the active base interface plate 20. Initial engagement is performed utilizing the manipulator arm wrist roll joint 22 with final rigidization and connector actuation being performed by components within the active base interface plate 20. Connector engagement is optional.

The active base interface plate 20 internal design is based on barrel-cam sequencing, therefore it is able to operate all mechanisms from a single rotational actuator. This design has the benefit of compact, light-weight packaging, low-power requirements and easy configurability with respect to mechanism stroke and timing. The active base interface plate 20 design provides capability for EVA (extra vehicular activity) actuation, as well as incorporation of the above-mentioned vision based capture system for either automated or human-in-the loop operational modes. The vision system provides sensing (image and a measure of the relative misalignment of the two plates) and this information is used to control the manipulator either in the human-in-the-loop control or automatic control modes.

The passive base interface plate 26 design is compact and entirely passive in function; it is extremely robust in application and tolerant to the wide variety of environmental extremes encountered in space exploration (i.e. cold vacuum, lunar regolith, etc.). The passive base interface plate 26 contains no mechanisms or moving parts and, due to its relative simplicity, provides a very light weight robotic interface. The passive base interface plate 26 is flexible and allows both full-size (load constrained application) and reduced size (size constrained application) interface options.

To facilitate vision based capture by active base interface plate 20 integrated vision system, the passive base interface plate 26 is marked to provide visual cues for both the automated and human-in-the-loop capture modes.

Passive Base Interface Plate (PBIP)

Figure 2:
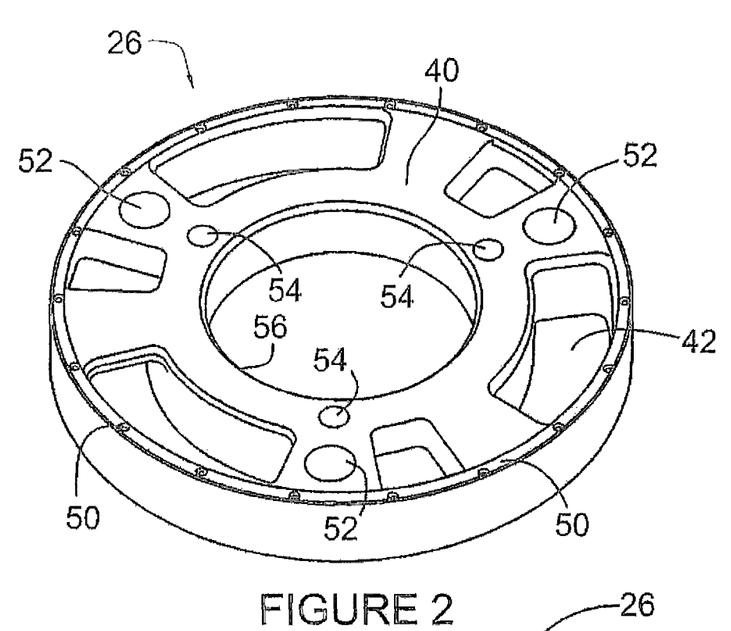
FIG. 2 shows a perspective top view of a passive base interface plate forming part of the scalable common interface plate system.
Figure 3:
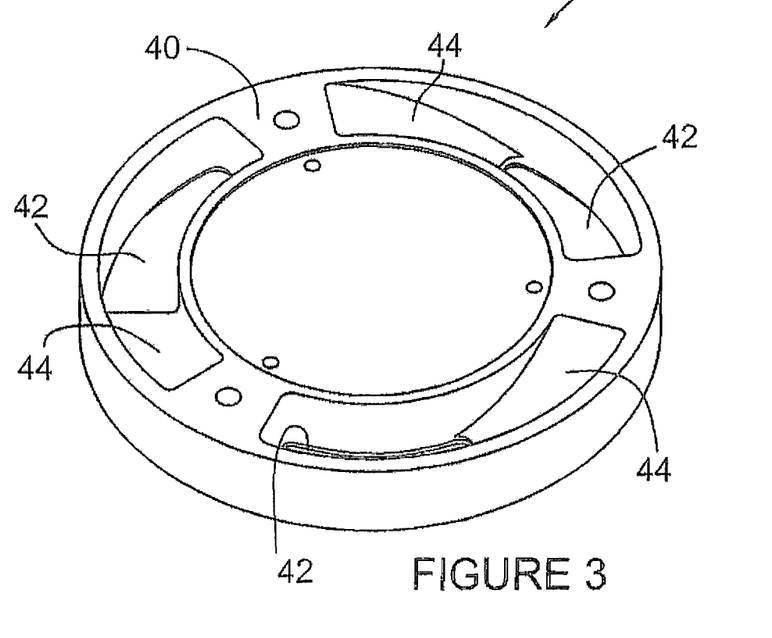
FIG. 3 shows a perspective bottom view of the passive base interface plate of FIG. 2.

The passive side of the present scalable common interface plate system, the passive base interface plate 26, is the complementary mating surface to the active base interface plate 20 and targeted as a low-profile alternative to the power data grapple fixture in non-free flyer capture operations. The passive base interface plate 26 economical design requires no electronics for actuation or keep-alive and contain no mechanisms and thus provides a low-cost, light-weight and robust alternative tolerant to significant environmental extremes. FIG. 2 shows a perspective top view of an embodiment of the passive base interface plate 26 and FIG. 3 shows a perspective bottom view of the passive base interface plate 26.

The passive base interface plate 26 is preferably a machined disk 40 made of aluminium, specifically contoured to be complementary to the outer set of preload wedges forming part of the active base interface plate 20, (to be discussed hereinafter) as well as to reduce interface misalignments as the active base interface plate 20 and passive base interface plate 26 are brought together. Specifically, the passive base interface plate 26 includes slots 42 having three wedge surfaces 44, on the bottom surface of the plate 26, see FIG. 3. The passive base interface plate 26 includes three equally spaced holes 52 located on the top surface penetrating into the plate near the outer periphery of the plate 40, and spaced just in from holes 52 are smaller diameter tapered holes 54, see FIG. 2. Holes 52 are the holes for the mounting bolts used to affix the plate 26 to the mounting structure to which plate 26 is to be rigidly attached.

A low-friction interface contact ring 50, seen in FIG. 2 (made of Vespel® (sold by Dupont) or nylon) near the outer periphery of the passive base interface plate 26 will reduce the required wrist roll joint torque during the interface preload portion of the interface mate operation.

Interface preload results from the machined passive base interface plate 26 wedge surfaces 44 reacting against the active base interface plate's 20 preload wedges 74 as the wrist roll joint 22 is rotated. Alignment of the interface will be complete after engagement of tapered rigidization pins of the active base interface plate 20 into complementary collocated taper holes 54 in the top surface of passive base interface plate 26, see FIG. 2. The tapered rigidization pin design provides additional misalignment tolerance of the mated interface and, due to the preload developed in the rigidize pin deployment, helps to ensure a highly repeatable relative orientation of the two interfaces.

Souriau plug connectors, if required for the application, may be rigidly installed to the passive base interface plate 26 body without accommodation for compliance (as compliance is already built in to the receptacle portion of the connection) or protective covers. Material selections for the body of the passive base interface plate 26 are driven by interface stiffness requirements and efforts to minimize mass, and therefore aluminum is preferred. To help reduce sliding friction of the wedge surfaces during preload, passive base interface plate 26 wedge surfaces 44 may have either a hard, high-tolerance surface finish (<16 µm) or dry film lubricant (i.e. Vitro-lube or Lubeco) applied thereto.

Active Base Interface Plate (ABIP)

Figure 4:
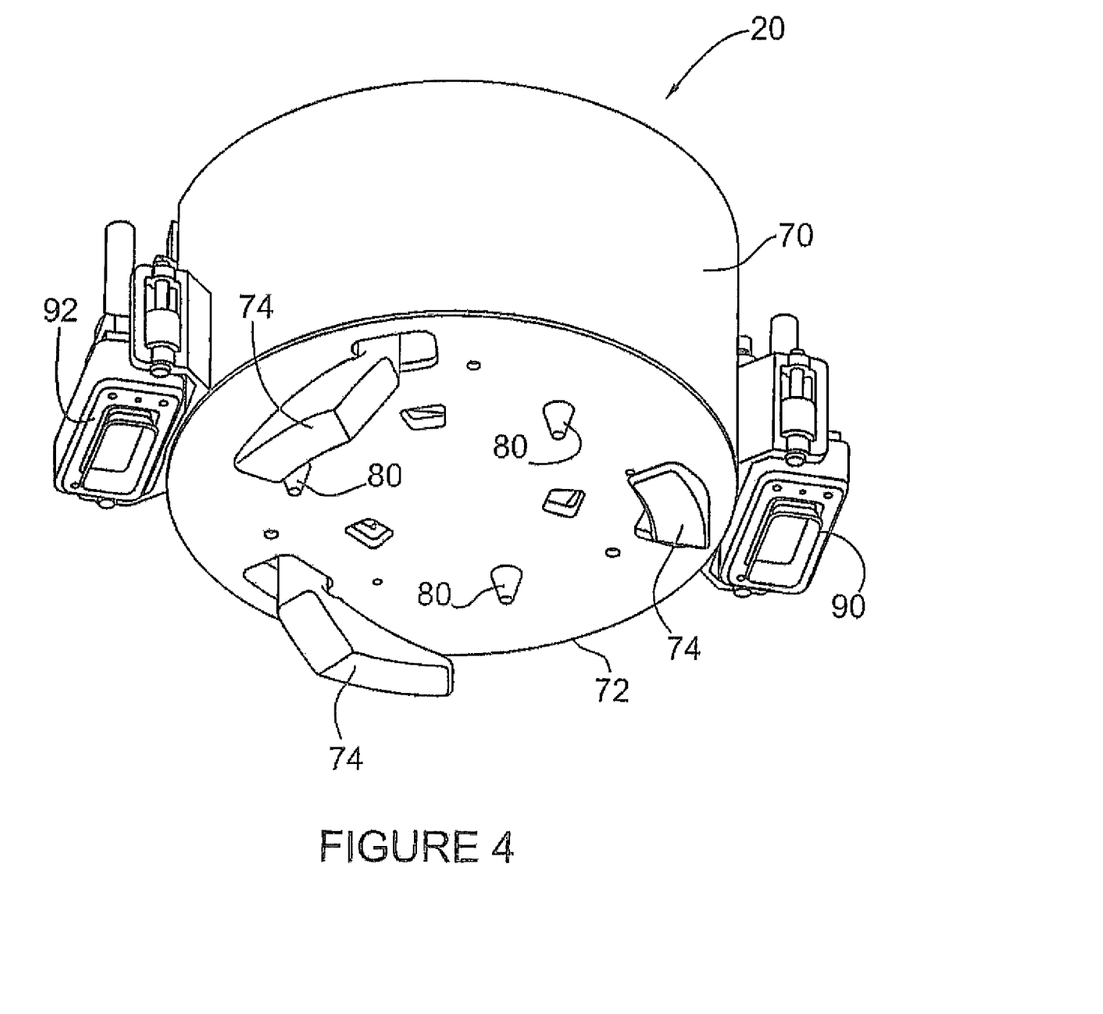
FIG. 4 shows a perspective view of an active base interface plate looking at the bottom of the plate.

FIG. 4 shows a perspective view of the active base interface plate 20 looking at the bottom of the plate. Plate 20 includes a cylindrical housing 70 attached to a base plate 72 and three interface wedges 74 on the bottom of plate 72 that each engage with a corresponding set of complementary wedge surfaces 44 located on the passive base interface plate 26. Also protruding through the bottom of base plate 72 are three tapered rigidization pins 80. During the mating operation, once the wedges 74 have engaged wedge surfaces 44 in plate 26 pins 80 are inserted into complementary collocated taper holes 54.

As mentioned above, and referring to FIGS. 1 to 4, the mate/demate operations are enabled by way of transforming the wrist roll joint rotation into the interface preload. Interface preload is developed as wedging action due to the roll joint rotation driving the interface wedges 74 down (relative to the passive base interface plate 26 top surface), compressing a spring stack on which the active base interface plate 20 interface wedges 74 are mounted. The interface is ultimately locked in its preloaded condition by actuating the trio of drive pins 80 from the active base interface plate 20 into the holes 54 in passive base interface plate 26.

Referring to FIG. 4, two electrical connectors 90 and 92 are attached to the outer surface of cylinder 70. Connectors for delivering data and power, if required for the application, may be integral to the passive base interface plate 26 body and positioned such that they are fully engaged at active base interface plate 20 connectors 90, 92 end-of-stroke. The passive base interface plate 26 may be constructed in different sizes, for example, but not limited to two sizes in which one may be a full-size, high-stiffness interface to accommodate manipulator base operations and to interface with large tools/payloads (i.e. free-flyer end-effector tool) as well as a smaller available interface for tools and smaller payloads. Both designs accommodate a target/visual cue system to allow for either automated capture or human-in-the loop operational capture modes. The internal structure of the active base interface plate 20 is described in further detail below.

Figure 5:
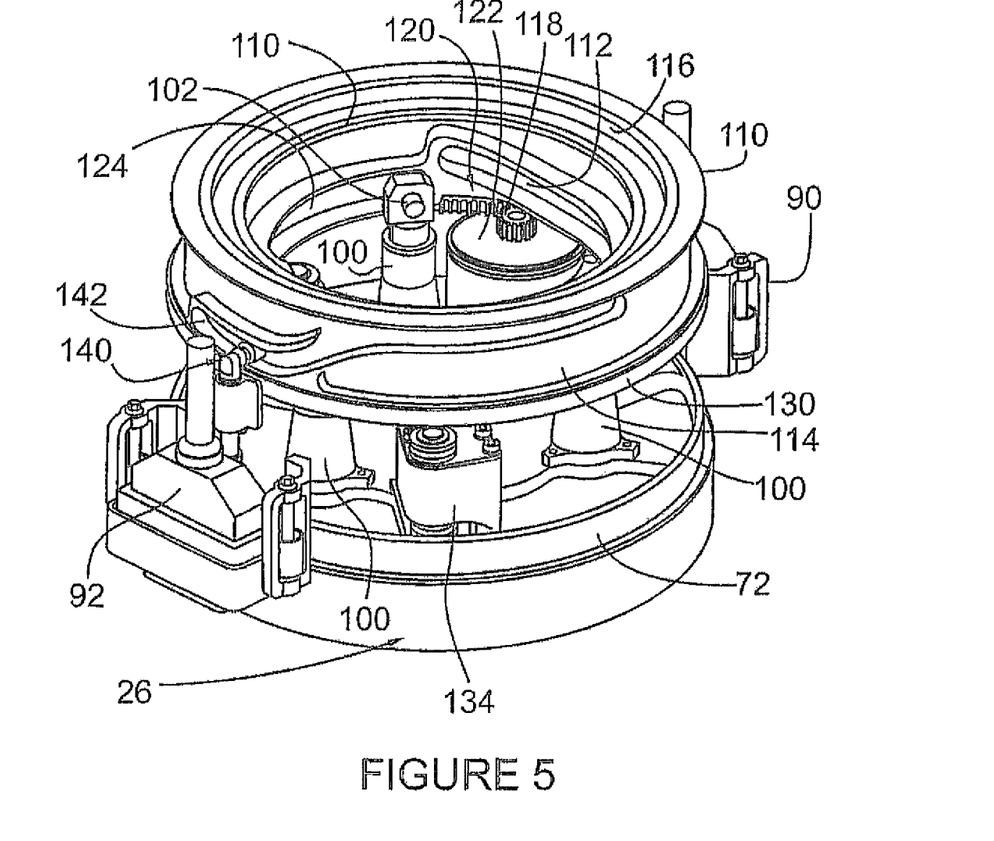
FIG. 5 shows a perspective view of the active base interface plate absent the cylindrical wall showing the interior of the active base interface plate.
Figure 6:
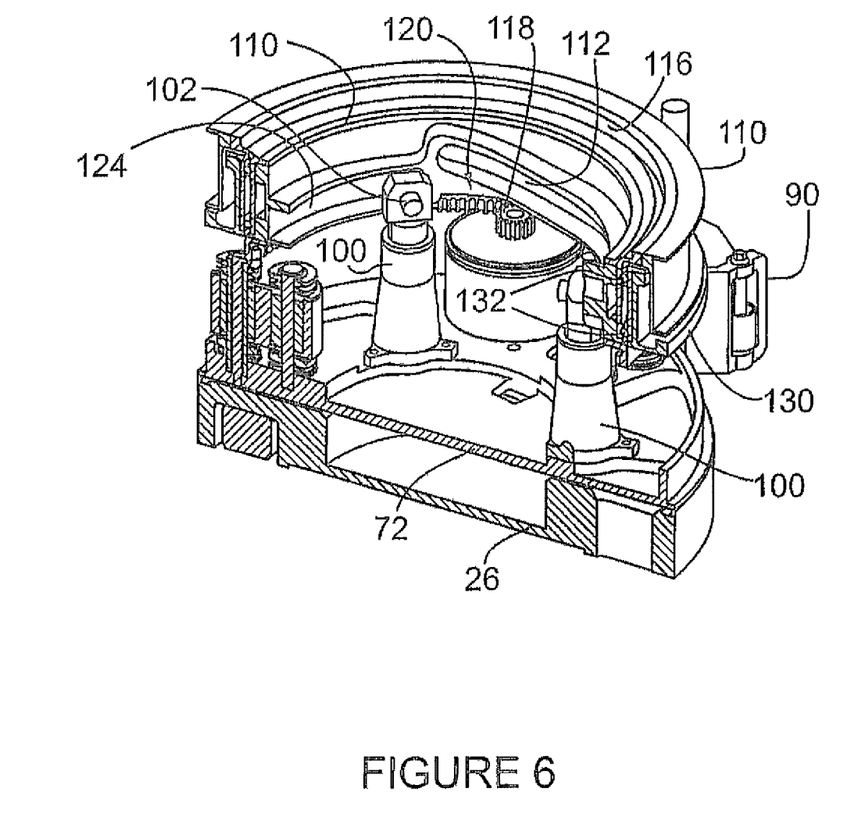
FIG. 6 shows a cross-section showing preload wedge assembly and the active base interface plate mated to the passive base interface plate.
Figure 7:
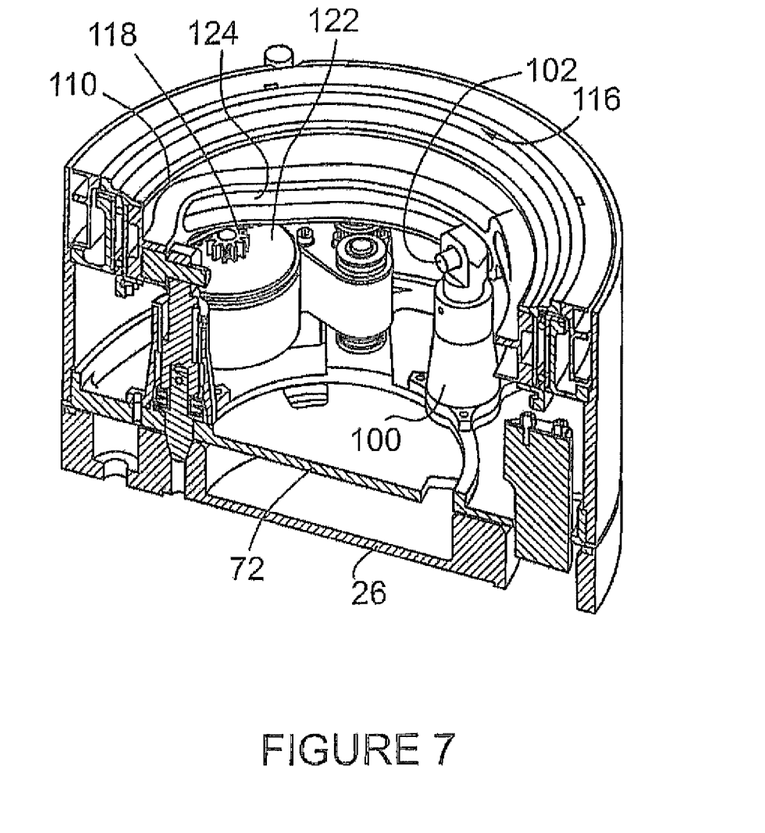
FIG. 7 shows a cross-section of the active base interface plate mated to the passive base interface plate showing rigidize pin assembly.

FIG. 5 shows a perspective view of the active base interface plate 20 absent the cylindrical housing 70. Three rigidization pin assemblies 100 are mounted on base plate 72 (only two visible in FIG. 5), with each assembly 100 containing one of the three tapered pins 80 discussed above. A barrel cam assembly 110 includes an inner barrel cam ring 112, and an outer barrel cam ring 114 with the inner ring 112 and outer ring 114 separated by a barrel cam spacer ring 116. A toothed drive ring 120 is attached to the bottom of the inner barrel cam ring 112.

Mounted on top of each pin assembly 100 is a rigidization pin follower 102 which are engaged in the cam track 124 of the inner barrel cam ring 112. An actuator/active base interface plate (ABIP) motor module 122 is mounted on the top surface of plate 72 which rotates a drive gear 118 which is meshed with the drive ring 120 for rotating the barrel cam assembly 110 and hence all three rings 112, 114 and 116.

A bearing support bracket 130 is mounted on the barrel cam assembly 110 and a large diameter roller bearing stack 132 supports the barrel cam assembly 110 on the interior of the outer casing 70. Three interface pre-load finger assemblies 134 are mounted on top of plate 72, and each supports one interface preload wedge 74.

A connector cam follower 140 engaged into the outer cam track 142 of outer barrel cam ring 114 is connected to each of electrical connecters 90 and 92.

Figure 8:
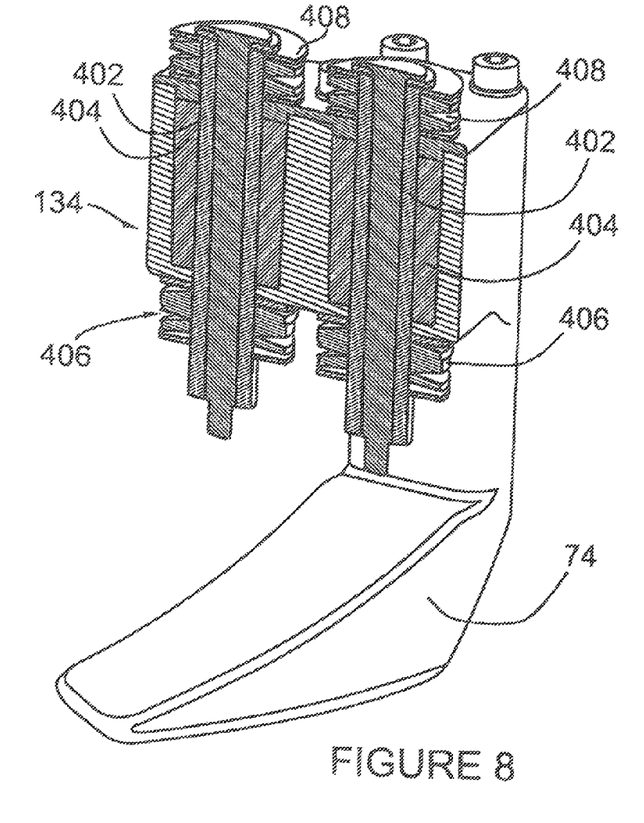
FIG. 8 shows a partial cross section of an interface wedge which forms part of a locking mechanism of the present device.

Referring now to FIG. 8, the interface preload wedges 74 are mounted to the internal side of the active base interface plate 20 interface plate 72 via a pair of fixed linear bearing races 402 and will be oriented to allow limited vertical motion of the wedge 74 with respect to the active base interface plate 20 and interface plate 72. Each wedge 74 contains an enclosed pair of corresponding linear bearings 404 and will be isolated from the active base interface plate 20 structure by a bi-linear stiffness Belleville spring stack 406. The stack 406 includes a high travel, low stiffness section (for predictable interface preload) in series with a low travel, high stiffness section (for high interface stiffness). It is noted that it in operation, wedges 74 are neither extended nor retracted. They are suspended using the Bellville stack 406 and are forced up and down by their interaction with the mating surfaces 44 on the passive base interface plate 26 when the manipulator roll joint 22 is driven.

Nominal interface preload will target 100% of the soft spring stroke to reduce any 'deadband' in the interface stiffness. Wedge travel of wedges 74 is limited in the negative direction by the available stroke of the bi-linear stiffness Belleville spring stack 406, while travel in the positive direction is limited by the available stroke of another low travel, high stiffness, rebound spring stack 408. The rebound Belleville spring stack 408 provides a compliant hardstop in the event of inadvertent contact of a given wedge and structure. At assembly, the springs 406 and 408 will be preloaded, positioning the wedge 74 in an equilibrium position resulting from the various spring stiffnesses.

The scalable common interface plate system disclosed herein is advantageous in that it can be readily scaled to whatever size the application requires. For example, the passive base interface plate 26 may be scaled down to a smaller size for mounting on tools that need to be picked up using the system. The active base interface plate 20 can be scaled proportionately for use as an interface for picking up the tool. This smaller active base interface plate 20 can also be mounted inside a larger version of the active base interface plate 20 to produce a compound active base interface plate device which can be used as the mating device for either the manipulator base with a larger passive base interface plate 26 or for picking up tools with a smaller passive base interface plate 26. This version of the active base interface plate will have two concentric sets of wedge groups 74, locking pins 80, connectors and actuators. The outer set will be sized for the larger passive base interface plate and the inner set will be sized for the smaller passive base interface plate 26. Thus a large active base interface plate can interface to a large passive base interface plate, a small active base interface plate can interface to a small passive base interface plate. A compound active base interface plate device can interface to either a large passive base interface plate or a small passive base interface plate.

Figure 9:
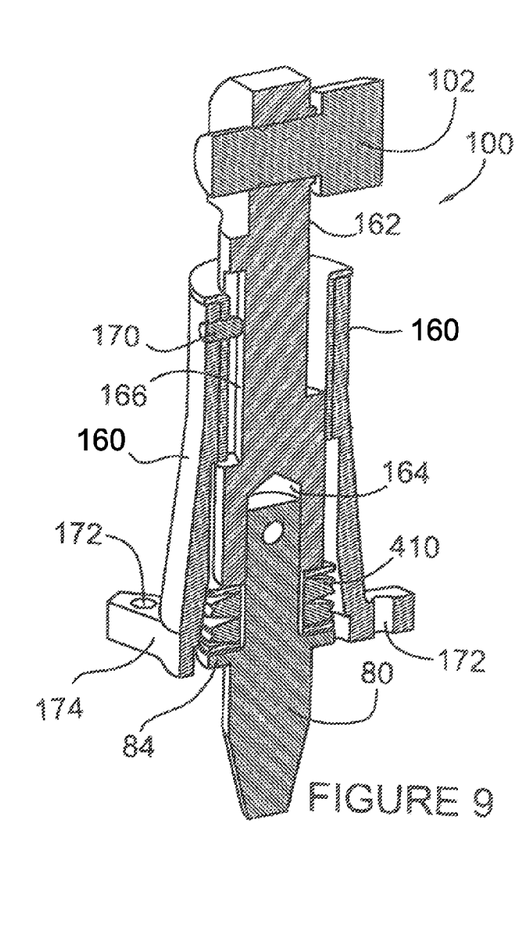
FIG. 9 shows a cross section of a rigidization pin assembly forming part of the present scalable common interface plate system.

FIG. 9 shows a cross section of a rigidization pin assembly 100 which includes a housing 160 and a piston 162 having a cutout 164 for receiving the top section of tapered pin 80. Piston 162 has a channel 166 cut out of one side and a pin 170 mounted in housing 160 projecting into channel 166 so that as piston 162 moves up our down, the pin 170 hitting the ends of the top or bottom of channel 166 acts as hard stops and also prevents the rotation of the piston 162. A base 174 with holes 172 located therein allows pin assembly 100 to be bolted to base plate 72. Rigidization pin follower 102 is mounted in the top section of piston 162. A Belleville spring stack 410 is mounted around the top end of tapered pin 80 bearing against a shoulder 84 around the midsection of pin 80 and the bottom end of piston 162.

Referring to FIGS. 5 and 9, the connector and rigidize pin extend mechanism is composed of the active base interface plate 20 motor module (AMM) 122 ring gear 120, inner barrel-cam surface 124, outer barrel-cam surface 142 and the various necessary pin/connector cam sliders/rollers 102 and 140. The outer and inner barrel-cam surfaces 142 and 124 respectively will be rigidly affixed to each other and supported by the active base interface plate 20 housing 70 via large diameter roller bearing stack 132. Operationally, the cam surfaces will be rotated by the AMM 122 and a ring gear 120 mounted to the underside of the inner barrel cam ring 112. Cam surfaces 124 and 142 are coordinated to engage the rigidize pins 80 first (AMM 122 target drive Position 1), followed by connector engagement if required (AMM 122 target drive Position 2). Overall travel range of the pins 80, connectors and barrel cam assembly 110 are limited by cam surface design. The motion of the rigidize pin top portion will follow the cam surface and compress the Belleville spring stack 410 in line with the taper-tipped engagement pins 80 that interface to the passive base interface plate 26. The preload that develops between the cam surface and the taper-tipped component 80 will ensure a zero free play contact between the two taper surfaces.

In operation, as mentioned above, the initial positioning and interface alignment may be performed with standard manipulator operations assisted by a vision system integral to the active base interface plate 20. Initial engagement is performed utilizing the manipulator arm wrist roll joint 22 with final rigidization and connector actuation being performed by components within the active base interface plate 20.

The manipulator maneuvers the active base interface plate 20 either autonomously or under operator command to a position where the passive base interface plate 26 is within the range of the vision system. The manipulator is then commanded in vision guided mode to insert the active base interface plate 20 wedges 74 into the corresponding slots in the passive base interface plate 26 to achieve a ready to engage relative position and orientation. The manipulator wrist roll joint 22 is then commanded to cause the wedges 74 to engage with the corresponding mating surfaces 44 on the passive base interface plate 26 and achieve the required preloading of the Bellville stacks 406. At this point the rigidize pins 80 will be sufficiently aligned with the corresponding tapered holes 54 in the passive base interface plate 26 to guarantee engagement. The motor module 122 is now commanded to Position 1 to cause the rigidize pins 80 to engage with the tapered holes 54 and thus causing the interface to lock in place under a preloaded condition. The motor module 122 is now commanded to Position 2 to cause the connectors 90, 92 to advance and mate with the corresponding mating halves mounted on the passive base interface plate 26 thus completing the mating operation. The demating operation consists of the following steps: The motor module 122 is commanded to Position 1 to cause the connectors 90, 92 to demate. Then the motor module 122 is commanded to its standby position to cause the rigidize pins 80 to withdraw from holes 54 and cause derigidization of the interface. The manipulator roll joint 22 is now commanded to disengage the wedges 74. The manipulator is then commanded to maneuver the active base interface plate 20 away from the passive base interface plate 26 thus completing the demating operation.

While the embodiments described herein describe three wedges 74, three slots 42, three pins 80, and three tapered holes 54, a different number of wedges, slots, pins, and holes may be employed. Further, those skilled in the art will appreciate that different actuators may be used to extend and retract pins 80 and electrical connectors 90, 92. Non-limiting examples of such actuators may include solenoids, dc motors, stepper motors, and pneumatic actuators. The above embodiments describe only a few examples of the various configurations and specific elements that may be used with embodiments of the present invention. As such, the listing of specific examples is not intended to limit the scope of the present invention.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of mating an object to a robotic manipulator, said method comprising the steps of:
   providing an active base interface plate affixed to said robotic manipulator, said active base interface plate including at least one wedge protruding from said active base interface plate, at least one locking pin, and an actuator for extending and retracting said at least one locking pin,
   providing a passive base interface plate affixed to said object, said passive base interface plate including at least one slot and at least one pin hole,
   commanding said robotic manipulator to maneuver said active base interface plate affixed to said robotic manipulator towards said passive base interface plate such that said at least one wedge protrudes through said at least one slot,
   commanding said robotic manipulator to rotate said active base interface plate such that said at least one wedge contacts a bottom surface of said passive base interface plate, and
   commanding said robotic manipulator to extend said at least one locking pin into said at least one pin hole.

2. The method of claim 1, wherein said active base interface plate further includes a barrel cam assembly, the barrel cam assembly including an inner cam track connected to said at least one locking pin, the actuator being a motor connected to said barrel cam assembly, and wherein said step of extending said at least one locking pin includes commanding said motor to rotate said barrel cam assembly, thereby extending said at least one locking pin.

3. The method of claim 1, wherein said active base interface plate further includes at least one electrical connector and said passive base interface plate further includes at least one electrical receptacle, and wherein said method further comprises the step of
   extending said at least one electrical connector to plug into said at least one electrical receptacle.

4. The method of claim 3, wherein said active base interface plate further includes a barrel cam assembly, the barrel cam assembly including an inner cam track connected to said at least one locking pin and an outer cam track connected to said at least one electrical connector, the actuator being a motor connected to said barrel cam assembly,
   wherein said step of extend said at least one locking pin includes commanding said motor to rotate said barrel cam assembly, thereby extending said at least one locking pin,
   and wherein said step of extending said at least one electrical connector includes commanding said motor to further rotate said barrel cam assembly, thereby extending said at least one electrical connector.

5. The method of claim 1, wherein said passive base interface plate further includes visual markers, and wherein said robotic manipulator is controlled using a vision system and one of either a human-in-the-loop or automatic control modes.

6. The method of claim 1, wherein said at least one locking pin is three locking pins and said at least one pin hole is three pin holes.

7. The method of claim 6, wherein said at least one wedge is three wedges and said at least one slot is three slots.

* * * * *